Sept. 18, 1934.   F. N. JOHNSON   1,973,766
COUPLER FOR TRACTION VEHICLES
Filed May 15, 1933
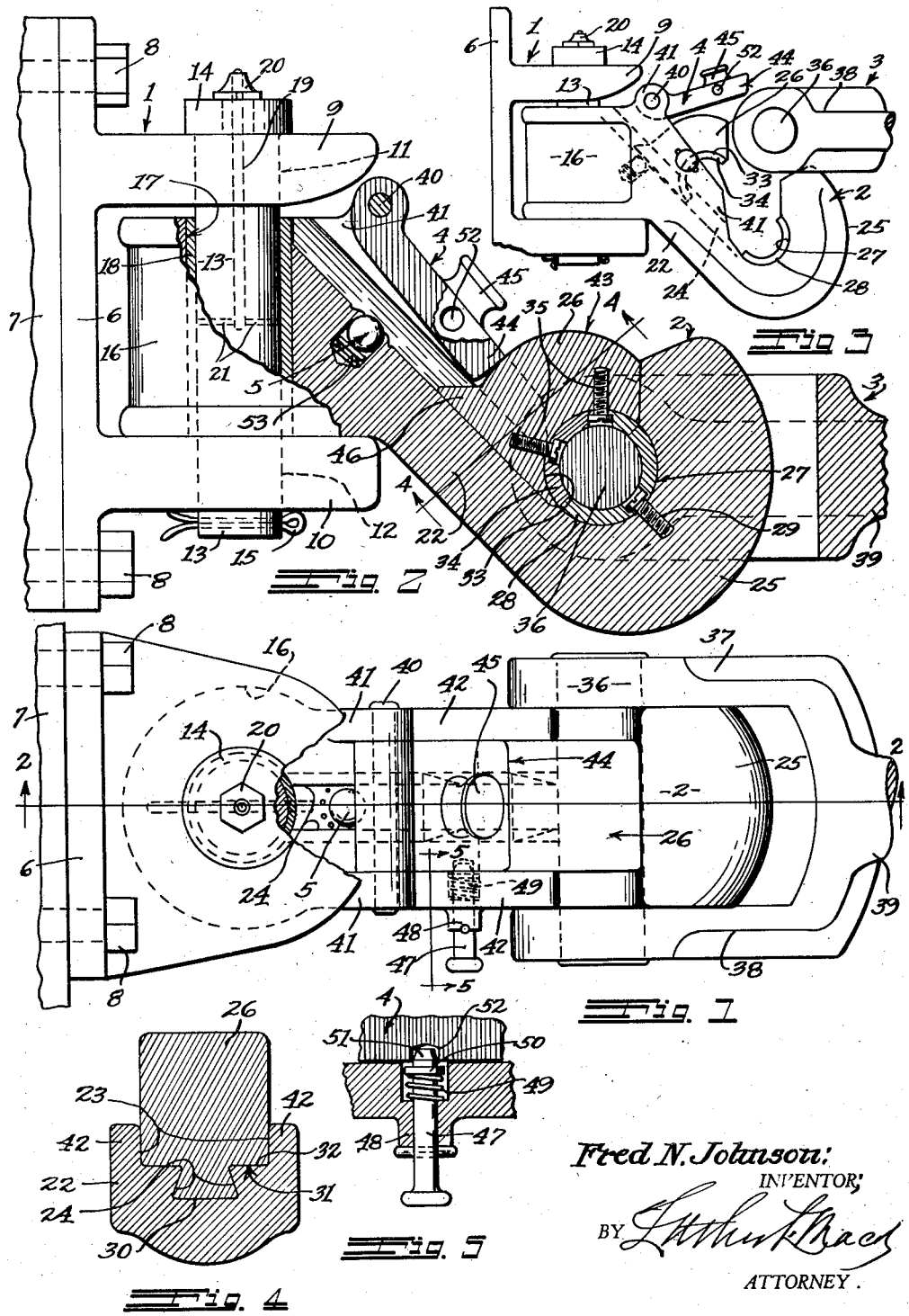

Patented Sept. 18, 1934

1,973,766

UNITED STATES PATENT OFFICE 1,973,766

COUPLER FOR TRACTION VEHICLES

Fred N. Johnson, Belvedere Gardens, Calif.

Application May 15, 1933, Serial No. 671,174

14 Claims. (Cl. 280—33.15)

This invention relates to and has for an object the provision of a coupler for traction vehicles, and particularly adapted for hitching trailers to trucks, tractors and the like. The invention comprehends, primarily, the provision of a strong and durable coupling composed of a plurality of members so connected that a universality of movement is permitted between the draft vehicle and the trailer, so as to accommodate the coupling to unevenness, curves, inclines and other irregularities in the roadbed.

An important object of my invention is to provide in a coupling of the character mentioned means for so connecting the tractor and trailer as to take up all clearance and prevent any lost motion in the members of the coupling, thereby preventing undue and unnecessary shock to the tractor frame when the tractor and trailer are started or stopped.

To this end the invention contemplates the provision of a coupling embodying a solid and substantial member attached to the rear portion of the tractor frame and provided with a suitable bearing, a second member attached to the tongue or other suitable portion of the trailer, and an intermediate knuckle provided with a pin journaled in the bearing of the first member and a relatively right angular bearing for the reception of a pin carried by the second member, said last mentioned bearing being separable for engaging the pin of the second member therewith and for disengaging the same therefrom.

A further object is to provide a lock adapted to tightly engage a separable part of the bearing on the knuckle so as to retain said part closed against the associated part of the bearing while the coupling is in use.

Other objects include: means for slidably supporting the movable portion of the bearing on the knuckle to permit the opening and closing of the bearing, and means for supporting said movable portion in opened position while the trailer is being hitched to the tractor.

In the accompanying drawing I have shown a preferred embodiment of my invention in which:

Fig. 1 is a top plan view.

Fig. 2 is an elevation, partly in section, with the knuckle bearing shown in closed position and operatively associated with the trailer attaching member for pulling the trailer.

Fig. 3 is an elevation of the same with the knuckle bearing open in readiness to receive the trailer attaching member.

Fig. 4 is a transverse section of the knuckle on line 4—4 of Fig. 2.

Fig. 5 is a fragmentary section of the knuckle on line 5—5 of Fig. 1 showing a latch for locking the knuckle bearing in closed position.

Briefly described, a preferred form of device includes a truck or tractor attaching member 1 in the form of a bracket, a knuckle 2 hingedly attached thereto at one end, a trailer attaching member 3 adapted for pivotal attachment to the knuckle, a lock 4 for maintaining an operative engagement between the knuckle 2 and the member 3, and a detent 5 arranged and for the purpose hereinafter described.

The bracket 1 has a flat base plate 6 which is attachable to a rear frame member 7 of a truck or tractor by means of bolts 8 or otherwise, and a pair of vertically spaced lugs 9 and 10 which are bored at 11 and 12, respectively, in vertical alinement, to receive a pin 13. Said pin has a head 14 which rests upon the upper side of lug 9 and a cotter pin 15, or other device, may be secured thereto at its lower end below the lug 10, to retain the pin in position on the bracket.

Knuckle 2 has a hub or boss 16 which is bored at 17 to receive a bushing 18, and said bushing forms a journal for the pin 13. Thus the knuckle hub 16 rests upon the lowermost lug 10 and is oscillatable on the axis of pin 13. The bearing or journal 18 may be lubricated by any suitable means, as for instance by means of a vertical passage 19 in the pin 13 which is closed by a grease plug 20, and one or more transverse passages 21 leading from the passage 19 to the bearing 18.

Knuckle 2 has an inclined arm 22 of channeled cross section formed with an open channel 23 at its upper side and a narrower reentrant, or inverted T channel 24 below the plane of channel 23, as shown in Fig. 4. The arm 22 terminates at its lower extremity in a hook shaped bearing portion 25 which, together with a slidable bearing member 26, forms a bearing for the trailer attaching member 3.

As shown in Fig. 2, the portion 25 is arcuately formed at 27 at the lower end of arm 22 to receive one-half of a split bearing, as at 28, secured to the knuckle by means of a screw, or screws, 29. The member 26 (see Fig. 4) is of rectangular cross section and has on its bottom a tongue 30 of reentrant or inverted T form to correspond to the form of the groove 24 in which the tongue is slidably engaged. The bottom side 31 slidably engages the bottom 32 of channel 23 in arm 22.

The lower end of member 26 is arcuately formed at 33 to receive one-half of a split bearing, as at 34, secured to the member 26 by means of screws 35. Thus the members 28 and 34 form a bearing for a pin 36 when the member 26 is closed and locked against the portion 25 of the knuckle, as shown in Fig. 2.

The trailer attaching member 3 is preferably in the form of a clevis with laterally spaced arms 37 and 38 extending forwardly from a stem or hub 39, and said arms are bored transversely to hold the pin 36.

The bearing lock 4 is pivotally supported on a pin 40 carried in lugs 41, 41 extended upwardly from the sides 42, 42 of arm 22 of the knuckle, and is movable between said sides to and from operative position. The outer surface 43 of member 26 is arcuate in form and is adapted to be engaged by the lower end 44 of lock 4 so that when member 26 is locked in closed position the lower end 44 of lock 4 will rest below dead center position with respect to a line which would cut the axes of pins 36 and 40. Preferably lock 4 is provided with a button 45 which may be tapped by a hammer or other tool for driving the lock tightly into locked position. The downward movement of the lock may be limited as by means of a heel 46 on member 26.

In order to insure against accidental displacement of the lock 4 I provide a plunger 47 slidable in a boss 48 on a side of the knuckle and carrying on its inner end a spring 49 bearing against a flange or washer 50 and tending to urge the extended end 51 of the plunger into a recess 52 in the corresponding edge of the lock 4. (See Fig. 5.)

The detent 5 may be in the form of a ball urged into frictional engagement with the bottom 31 of member 26 by means of a spring 53, so that when member 26 is retracted to the position shown in Fig. 3 the detent will be effective for cramping the tongue 30 in its groove 24, thereby retaining the knuckle bearing open while the attaching member 3 is applied thereto.

Members 1, 2, 3, 4 and 26 are preferably formed of heavy cast steel of ample size and strength so that the coupling embodied by said members may be employed to connect vehicles for heavy duty work such as for transportation of oil, gasoline and other products.

In operation, the attaching member 1 is permanently affixed to the portion 7 of a draft vehicle such as a truck or a tractor, and the attaching member 3 is permanently affixed to the tongue or other portion of a trailer. The knuckle 2 is then detachably mounted on the attaching member 1 with the bearing portion 25 thereof inclined downwardly for receiving the pin 26 of the trailer attaching member 3.

Usually the draft vehicle and the trailer are connected as follows: The trailer is stationarily held in position while the draft vehicle is connected for slow backward motion in the direction of the trailer, while the bearing member 26 of the coupler is held in open position by the detent 5. When the draft vehicle has reached a point of close proximity to the trailer the attaching member 3 is raised into position to clear the portion 25 of the knuckle 2 and the pin 36 is then dropped into engagement with the bearing member 28, whereupon the draft vehicle is stopped and the adjustable bearing member 26 is then moved into closed position, as shown in Fig. 2, and locked in such position by tapping the button 45 of member 4 with a hammer so as to force the lock 4 inwardly beyond dead center position adjacent the heel 46. When so positioned the recess 52 of lock 4 will register with and the clutch 47 will seat in said recess, thereby preventing the accidental dislodgment of the lock.

The trailer is disconnected from the draft vehicle by retracting the clutch 47 and inserting a bar or suitable tool between the sides 41 of the knuckle 2 and the lock 4, thereby prying the lock upwardly out of engagement with member 26 so as to permit the retraction of member 26 into engagement with the detent 5, whereupon the attaching member 3 is elevated so as to disengage the bearing 28 of the knuckle.

It will be readily apparent that the coupling herein shown and described is of strong and durable character, capable of withstanding heavy strains and shocks, and at the same time provides a universality of movement between the draft vehicle and the trailer to accommodate the movement of the trailer to any condition of the road on which said vehicles are moved.

In lieu of loose connections heretofore extensively employed in truck and trailer couplings, I have provided relatively tight connections, at least sufficiently tight to prevent undue wear and shock on the vehicles and yet permitting ample movement in the coupling members necessary to the proper operation of the coupling.

What I claim is:

1. A coupler for traction vehicles including attaching members secured to the draft and trailing vehicles respectively, said attaching members provided with relatively right angularly disposed coupling members, and a knuckle provided with relatively right angular bearings at its opposite extremities embracing the coupling members respectively on said attaching members, one of the bearings on said knuckle including a member slidable on said knuckle at right angles to the axis of the bearing for connecting and disconnecting the draft and trailing vehicles at will.

2. A coupler for traction vehicles including attaching members secured to the draft and trailing vehicles respectively, said attaching members provided with relatively right angularly disposed coupling members, a knuckle provided with relatively right angular bearings at its opposite extremities embracing the coupling members respectively on said attaching members, one of the bearings on said knuckle including a member slidable on the knuckle to and from operative position, for connecting and disconnecting the draft and trailing vehicles at will, and means for locking said separable members in operative position.

3. A coupler for traction vehicles including attaching members secured to the draft and trailing vehicles respectively, said attaching members provided with relatively right angularly disposed coupling members, a knuckle provided with relatively right angular bearings at its opposite extremities embracing the coupling members respectively on said attaching members, one of the bearings on said knuckle being separable for connecting and disconnecting the draft and trailing vehicles at will, and means for locking said separable bearing in operative position, said means including a locking member hinged on said knuckle and engaging a portion of said separable bearing, and a latch yieldably engaging and for preventing the dislodgment of said locking member from locking position.

4. A coupling for traction vehicles comprising a knuckle having a swiveled connection for attachment to a draft vehicle and a relatively right angular bearing for a swiveled connection with a trailing vehicle and including a pair of bearing members one of said bearing members being slidable on the knuckle to and from closed position with respect to the associated member, and locking means carried by said knuckle and engageable with and for holding said slidable bearing member in closed position.

5. A coupling for traction vehicles comprising a knuckle having a swiveled connection for attachment to a draft vehicle and a relatively right angular bearing for a swiveled connection with a trailing vehicle and including a separable bearing member slidable on the knuckle to and from closed position, and locking means carried by said knuckle and engageable with and for holding said slidable bearing member in closed position, said locking means including a primary locking member engaging said bearing, and a secondary locking member movably held on said knuckle for engagement with and to prevent the unlocking of said locking member.

6. A coupling for traction vehicles comprising a knuckle having a swiveled connection for attachment to a draft vehicle and a relatively right angular separable bearing for a swiveled connection with a trailing vehicle said bearing including relatively fixed and movable members, said movable member being slidable on the knuckle to and from closed position, locking means carried by said knuckle and engageable with and for holding said movable bearing member in closed position.

7. A coupling for traction vehicles comprising an attaching member secured to a draft vehicle and having a bearing, an attaching member secured to a trailing vehicle and having a relatively right angularly disposed bearing and a knuckle having bearings at its opposite extremities pivotally connected with said bearings of said attaching members, one of said bearings on said knuckle being provided with a member separable therefrom and movable on said knuckle and from closed position to permit the attachment and detachment of a trailing vehicle to the draft vehicle.

8. A coupling for traction vehicles comprising an attaching member secured to a draft vehicle and having a knuckle bearing, an attaching member secured to a trailing vehicle and having a relatively right angularly disposed bearing and a knuckle having bearings at its opposite extremities secured respectively to the bearings of said attaching members, one of said bearings being provided with a member separable therefrom and movable on said knuckle to and from closed position to permit the attachment and detachment of a trailing vehicle to the draft vehicle, and means on the knuckle for supporting said movable bearing member in open position while the trailing vehicle is attached thereto.

9. A coupling for traction vehicles comprising an attaching member secured to a draft vehicle and having a bearing, an attaching member secured to a trailing vehicle and having a relatively right angularly disposed bearing and a knuckle having bearings at its opposite extremities for connection, respectively, with said bearings of said attaching members, pintles in said bearings for operatively connecting said knuckle and said attaching members, one of said bearings on said knuckle being provided with a member separable therefrom and movable on said knuckle to and from closed position to permit the attachment and detachment of a trailing vehicle to the draft vehicle, means on the knuckle for supporting said movable bearing member in open position while the trailing vehicle is attached thereto, and means on said knuckle engageable with and for locking said movable bearing member in closed position.

10. A coupling for traction vehicles comprising an attaching member secured to a draft vehicle and provided with a bearing including a vertically disposed pintle, an attaching member secured to a trailer vehicle and provided with a horizontally disposed pintle, and a knuckle having a vertical bearing at one extremity embracing the pintle of said first mentioned attaching member, and a separable bearing at its other extremity embracing the pintle of said other attaching member and including a member slidable on said knuckle to and from closed position, and means for locking the slidable member of said bearing in closed position when said vehicles are coupled.

11. A coupling for traction vehicles including attaching members secured respectively, to a draft vehicle and a trailing vehicle, said attaching members provided with bearings and including pintles relatively disposed at right angles, and a knuckle connecting said attaching members and provided with a unitary bearing embracing one of said pintles and a separable bearing embracing the other pintle said separable bearing including a member slidable on said knuckle, and means for locking said slidable member in operative position.

12. A coupling for traction vehicles including attaching members secured respectively, to a draft vehicle and a trailing vehicle, said attaching members provided with bearings and including pintles relatively disposed at right angles, and a knuckle connecting said attaching members and provided with a unitary bearing embracing one of said pintles and a separable bearing embracing the other pintle, said separable bearing including a member slidable on said knuckle, means for locking said slidable member in operative position, and means on said knuckle for engaging and for holding said slidable member in open position while said vehicles are being coupled.

13. A coupling for traction vehicles including attaching members secured respectively, to a draft vehicle and a trailing vehicle, said attaching members provided with bearings and including pintles relatively disposed at right angles, a knuckle connecting said attaching members and provided with a unitary bearing embracing one of said pintles and a separable bearing embracing the other pintle said separable bearing including a member slidable on said knuckle, means for locking said slidable member in operative position, said locking means including a member hingedly supported on said knuckle and engaging said slidable member, and yieldable means on said knuckle engaging and for locking said hinged member in operative position.

14. A coupling for traction vehicles as characterized in claim 6, including: means on said knuckle for engagement with and for holding said movable bearing member in open position.

FRED N. JOHNSON.